Patented June 30, 1931

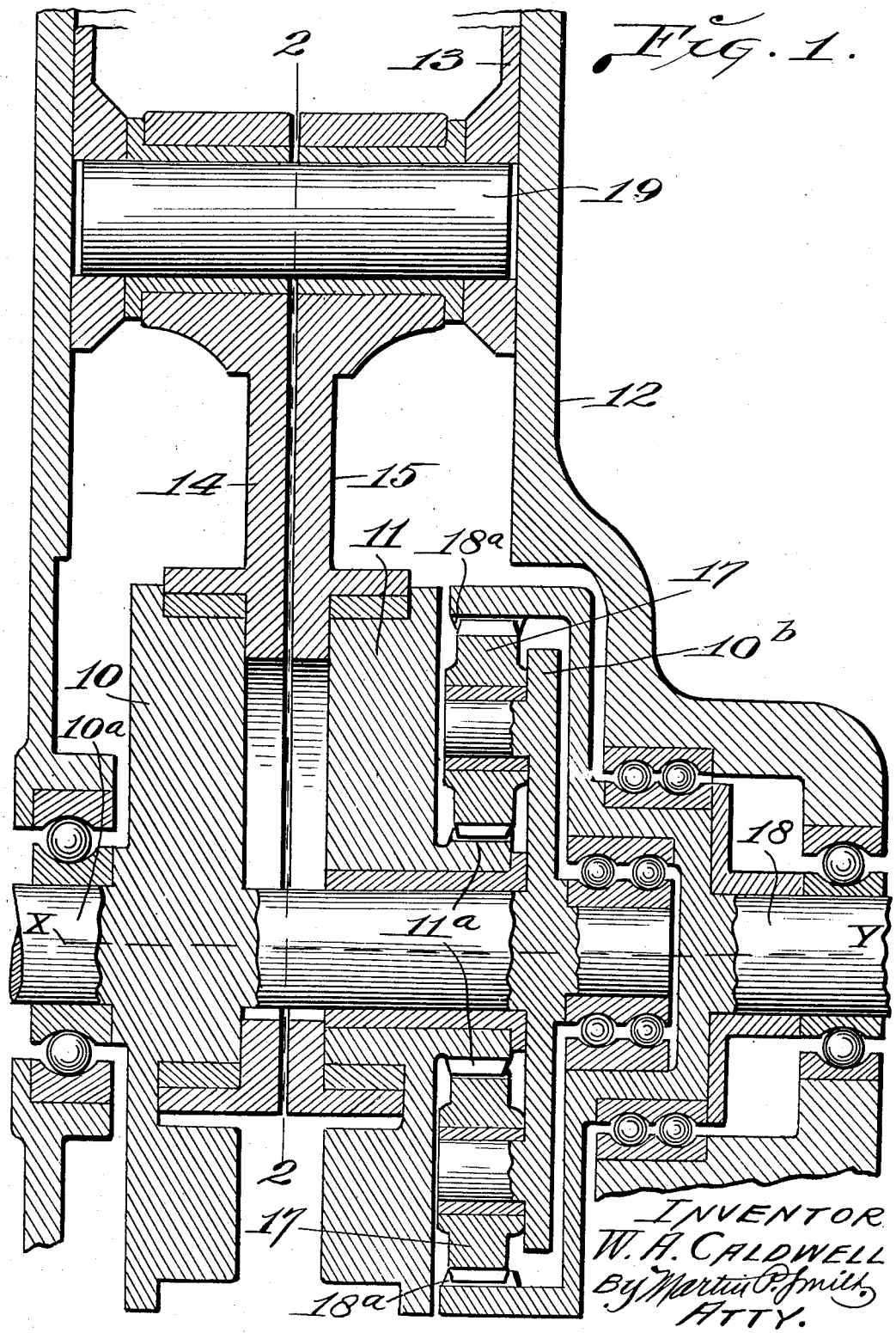

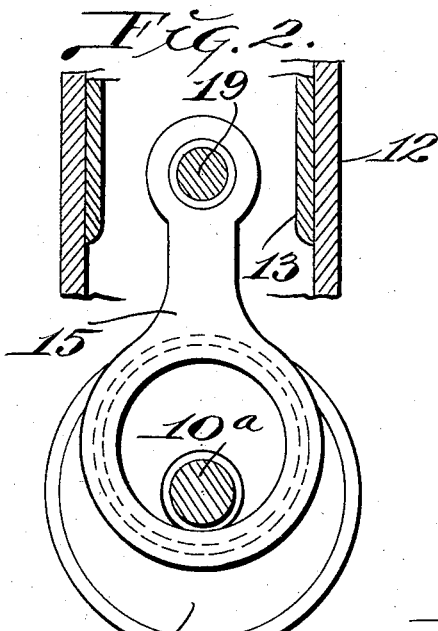
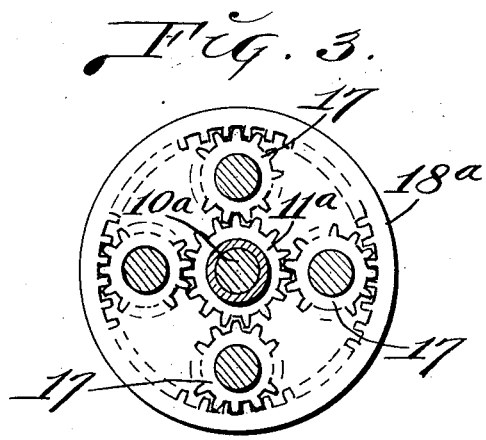
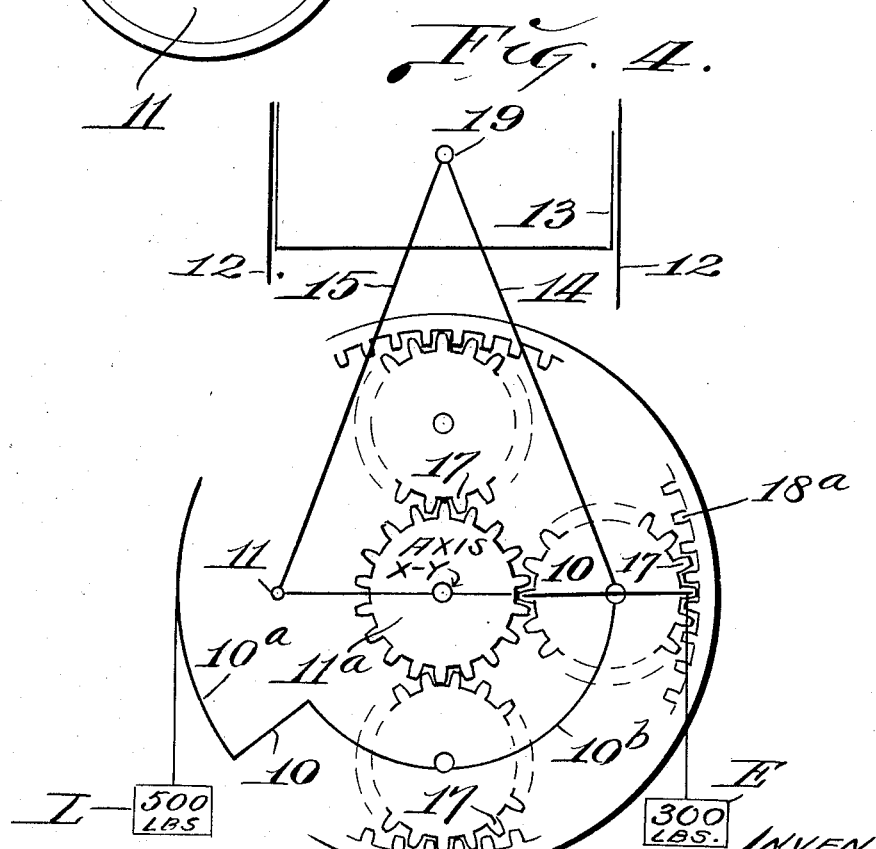

1,812,511

UNITED STATES PATENT OFFICE

WILLIAM A. CALDWELL, OF LOS ANGELES, CALIFORNIA

TWO SPEED POWER TRANSMISSION

Application filed August 13, 1927. Serial No. 212,709.

My invention relates to power transmission, wherein that force, existing in all conventional and operating power receiving, transmitting and consuming mechanisms, which tends to revolve the frame, or parts solidly affixed thereto, will be spoken of as the reactive force, or resultant torque of said mechanisms.

My invention further relates to power transmission wherein this so-called reactive force or resultant torque, as ordinarily found in power receiving, transmitting and consuming mechanisms when they are operating as such, is made use of for turning the parts usually held or solidly fixed to the frame, by transferring said conventional reactive force or resultant torque, from a dead inactive force, into a power for turning the parts above referred to, to the end that more speed or greater mechanical advantage may be had with any power receiving, transmitting and consuming mechanism.

The result just referred to, I accomplish principally by means of a sliding member constrained in movement by the frame of such aforesaid mechanisms, so that the transferred and changed original resultant torque will be registered by said sliding member against the frame as an ultimate, or transferred resultant torque.

To clearly define the meaning of the terms "reactive force" and "resultant torque" which terms are identical for the purposes of this specification, it will be noted that the force of an explosive gas or the power of electricity or any other source of power tending to rotate a shaft in one direction is always accompanied by a similar and equal force tending to turn the frame in an opposite direction. This force reacting against the frame is the reactive force or resultant torque as will be referred to in describing the principles of my invention.

Also, the same reactive force is met with in the standard and conventional mechanical advantage and reversing devices, wherein some part or member attaches to the frame so as to change the direction or speed of other members and, if the member or part of such devices that is held by the frame were free to move and under proper restraint, such reactive force or resultant torque, which is tending to move it when the device is operating, could be made to do useful work instead of standing idle and under pressure.

The principal object of my invention is to provide a mechanism of the non-adjustable or automatic type in which the movement of a driving member relative to a frame will be resultant in movement of a driven member relative to the same frame in one degree and in a proportionally different degree.

Thus, it is proposed to make use of the various types of mechanical advantage and reversing mechanisms which are now commonly used, by omitting to fasten any of the parts against rotation while, at the same time, leaving all the original parts thereof undisturbed in an absolute and relative sense. The part or parts that were before fastened to a final holding frame will, in my improved type of change speed gearing, be fastened to a member supported for movement by and relative to this so-called holding frame and will be further connected through means of this member to another part or element of the original mechanism. The entire mechanism will also be supported by this so-called holding frame so that all the essential parts of the original mechanism will have their usual movements relative to one another and, in addition, will have movement relative to this so-called final holding frame. Such mechanisms, as so utilized, will be more commonly known as epicyclic or planetary sets.

A further advantage gained in my two-speed power transmission unit is, that the usually inoperative and permanently held members, necessary in gaining mechanical advantage and in reversing shafts by the present methods are, by my method, free to move with all the other moving members thereof, so that direct drive or so-called high gear may be obtained without mechanical change or adjustment of any part concerned.

The member or part usually held and solidly fixed to the frame in all conventional mechanical advantage and reversing mechanisms, which in my two-speed power transmission is allowed to move, is connected to the so-called sliding member and said sliding member is in turn connected to the driving or driven shaft, so that, for each turn made by said ordinarily held and solidly fixed member in any rotative direction around its axis, a similar or reverse rotative turn will be made by the driving or driven member according to the one connected to the sliding member just referred to.

Thus, the ordinary resultant torque found in all conventional mechanical advantage and reversing devices, where they are operating as such is changed into power which in turn helps to drive the load or strengthens the driving source according to whichever one it is connected to. Or, this mobile or moving power may react against the load or the driving member so as to make them both equal, whereby no mechanical advantage exists and the device is in direct drive or high gear.

A further object of my invention is to provide means whereby the stress or strain exerted internally between the driver and the driven member in any mechanical advantage mechanism will be registerable and operate in conjunction with the speed of said mechanism, so that at certain definite speeds and certain strains, the device will automatically change from high gear to low gear.

A still further object of my invention, is to provide a two-speed power transmission that will change from low gear into high gear, whenever the usual (to be mentioned hereafter) driving member, temporarily becomes the driven member when, in accordance with the principles to be illustrated and explained later, said change from low to high gear will occur automatically and without mechanical change or adjustment of parts.

The principal means by which I accomplish the results herein described, consists in the utilization of principles and claims made by me in a co-pending patent application, filed July 6, 1927, Serial No. 203,700.

For the purpose of more fully illustrating and explaining the principles and statements already made and for substantiating the various claims to be made in connection with this two-speed power transmission, I have selected the conventional sun and planet or epicyclic train of gearing for showing the mechanics of my invention which is illustrated in the accompanying drawings in which:

Fig. 1 is a vertical section taken longitudinally through the center of my improved two-speed transmission, so that parts are symmetrical about the plane of division.

Fig. 2 is a cross section taken through the device on a line 2—2 of Fig. 1, showing one eccentric with its connecting member attached to the piston.

Fig. 3 is an elevational view of the type of epicyclic gearing used in this particular case, consisting of a center pinion meshing with four epicyclic pinions, which in turn mesh with an annular member or internal gear.

Fig. 4 is a broken section of the whole mechanism looking along its central axis of rotation, showing diagrammatically and in an elementary way, the several leverages involved together with the counterbalancing forces met with, and their equalization through means of the sliding member against the frame.

To more fully describe and illustrate the various functions of said two-speed power transmission, Fig. 1 will be first considered.

Referring by numerals to the accompanying drawings, members $18^a$—17 and $11^a$ constitute the so-called planetary or sun and planet gearing wherein $18^a$ is the annular or internal gear mounted for rotation about the axis X—Y upon a shaft 18, and shaft 18 in this particular case will be referred to as the driving member, although in one case (to be mentioned later), this shaft becomes the driven member temporarily.

As will be noted, the driving members 18 and $18^a$, being one and the same, are supported for rotation about the axis X—Y by the frame 12 through the conventional means of ball bearings as shown.

Shaft $10^a$, carrying the eccentric part 10 and the disk-like part $10^b$ are the driven members although, in one case (to be mentioned later), this shaft becomes the driving member temporarily.

Eccentric part 10 is fastened solidly to shaft $10^a$, so also is disk part $10^b$ fastened solidly to shaft $10^a$. Hence $10^a$, 10 and $10^b$ are solidly one body and are held for rotation about the axis X—Y by the frame 12 and a suitable bearing as shown on one end, while the other end is supported for rotation about the axis X—Y, by the revoluble member 18 and a suitable bearing as shown at their adjacent ends.

Numeral 11 designates another eccentric part identical to eccentric part 10 insofar as they have the same degree of eccentricity.

Numeral $11^a$ designates the center pinion of the planetary group which is solidly joined to eccentric 11 so that both 11 and $11^a$ rotate about the axis X—Y on the shaft $10^a$, being carried thereon by a suitable bearing as shown.

The disk-like part $10^b$, being solidly a part of eccentric 10 and shaft $10^a$, carries a plurality of pin-like projections, on which are mounted the epicyclic pinions 17 meshing with the center pinion $11^a$ and the annular gear $18^a$, one on each pin as shown. These pins are shaft-like so as to allow rotation about their centers, of the epicyclic pinions so held, and the axes of these several epicyclic pinions are therefore further constrained to revolve about the common axis X—Y. To better explain the workings of the device which is more or less difficult to follow, certain definite sizes of gears are assumed for the purpose mentioned.

In this particular case, the pitch diameter of the annular gear is 6″, pitch diameter of center pinion 2″ and pitch diameter of epicyclic pinions 2″ thus, the centers of aforesaid shaft-like projections on 10$^b$ are 2″ from the common axis X—Y and, the axes of rotation for the plurality of epicyclic pinions, being the same, are 2″ from X—Y, and parallel therewith. The above would mean that the annular gear 18$^a$ has three times as many teeth as the center pinion 11$^a$ and the pinions 17 would have the same number of teeth as the center pinion 11$^a$.

Numeral 14 designates a connecting rod and strap member joining the eccentric 10 to the piston pin 19 and piston 13 so as to change the rotative movement of eccentric 10 into reciprocative movement of the piston 13.

Numeral 15 designates another connecting rod and strap member joining the eccentric 11 to the piston pin 19 and piston 13 so as to change the rotative movement of eccentric 11 into reciprocative movement of the piston 13.

Obviously, since members 14 and 15 are joined together by a common connecting pin 19 and piston 13, any movement of eccentric 11 will be transmitted to eccentric 10 through the connecting rods 14 and 15, which are identical in length, so that eccentric 10 will be displaced just as much in either a forward or reverse direction as eccentric 11. Thus, any rotative movement of member 11 in either a forward or reverse direction must be accompanied by an equal rotative movement of member 10 in either the same or a reverse direction.

If eccentric body 10 revolves one turn in a clockwise movement about the axis X—Y, then eccentric body 11 must revolve one turn in the same rotative clockwise direction about axis X—Y or it must revolve one turn in a counter-clockwise direction about axis X—Y.

Thus, it will be seen that shaft 10$^a$ (being solidly fixed to eccentric 10, which also is fixed to 10$^b$, which carries the plurality of epicyclic pinions) and center pinion 11$^a$ (being solid to eccentric 11) are so interconnected that angular rotation by one about axis X—Y must be accompanied by equal angular rotation of the other, both in the same or reverse directions about axis X—Y and relative to the frame 12.

Therefore, any revolving of the axes of pinions 17 about the axis X—Y must be accompanied by an equal turning of pinion 11$^a$, about the axis X—Y in the same rotative direction or in a reverse rotative direction.

If center pinion 11$^a$, turns about the axis X—Y in the same rotative direction as shaft 10$^a$ carrying members 17, then they all travel together and under these conditions, all gears become locked together including the annular gear 18$^a$ on shaft 18. Therefore, all contributory parts rotative about the axis X—Y become as one and are locked together, whereby speed of driven member 10$^a$ is identical with speed of driving member 18 and both, having the same rotative direction, becomes a so-called direct drive. This is therefore, one speed in my improved two-speed power transmission.

However, if center pinion 11$^a$ should turn in a rotative direction opposite to the direction of rotation of shaft 10$^a$ (controlling revolution of axes of members 17 about axis X—Y), then a different condition exists, because each turn of member 11$^a$ in a counterclockwise rotation about axis X—Y, must be accompanied by an equal turning of the axes of epicyclic pinions 17 about the axis X—Y in a clockwise direction.

Therefore, since three turns of 11$^a$ in a counterclockwise direction, will equal one turn of annular gear 18$^a$ in the opposite or clockwise direction, and likewise since three turns of 10$^b$ (carrying pinions 17) about the axis X—Y, in a clockwise direction will equal four times of annular wheel and shaft 18 in a clockwise direction, it is apparent that five turns of driving member 18 will produce three turns of driven member 10$^a$ in the same direction. Thus, a three to five gear reduction ratio is obtained. This is second speed in my improved two-speed power transmission.

Fig. 2, which is a section on line 2—2 of Fig. 1 may be considered as representative of the manner in which connecting rod members 14 and 15 are countersunk into originally round pieces 10 and 11 so as to counterbalance them as eccentrics. This view also shows common connections of 14 and 15 to piston 13 and pin 19.

Fig. 3 is an end view illustrating the type of epicyclic or planetary gearing used in this particular case, wherein four epicyclic members 17 equally spaced around the pinion 11$^a$ are used for interconnecting annular gear 18$^a$ and pinion 11$^a$, the whole constituting an operative planetary gear set consisting of the three elements 11$^a$, 18$^a$ and 10$^a$, which last mentioned element carries the collection of epicyclic pinions 17.

The conventional use for this type of gearing is to hold one member against rotation so that one of the two remaining members becomes the driver and the other, the driven member. However, in my device, where all the members are free to rotate, if the connecting rods 14 and 15 have no angular separation and are off dead center and the member 18$^a$ is operating as the driving member, pressure will be exerted upon the center pinion 11$^a$ tending to rotate it in a reverse direction to that of 18$^a$. But, center pinion 11$^a$ cannot possibly rotate reverse to 18$^a$ until it first moves with 18$^a$ as far as the dead center position because of the restraining members 14, 15, 10 and 11 which join the members 11ª and 10ª to the piston 13. If, at the dead center position, the momentum of 11ª is great enough and the load applied to the member 10ª is not too great, 11ª will glide past the dead center position and again become locked to the members 18ª and 10ª so as to be impossible of reversal until the next dead center position is reached. This would be the conditions of direct drive, where all the members 11ª, 18ª and 10ª travel in the same direction and all at the same angular speeds. If, at the next dead center position, the momentum of the center pinion 11ª is not sufficient to carry it past the dead center position before the reaction between the driving member 18ª and the driven member 10ª stops it then, the center pinion 11ª will be reversed by this reactive force of the member 18ª tending to drive the member 10ª. This would be the conditions of low gear, where the driving and driven members 18ª and 10ª travel in the same direction but at proportionally different rates of angular speed and also, where the control member 11ª travels in a direction reverse to that of members 18ª and 10ª but at the same angular speed as the load member 10ª.

But, if the connecting rods 14 and 15 are off dead center and have angular separation, as shown in Fig. 4, and the member 10ª is temporarily the driving member with the member 18ª acting temporarily as the load member, pressure will be exerted upon both the members 11ª and 18ª tending to cause them to rotate in a direction the same as that of member 10ª. However, it will be impossible for the center pinion 11ª to go in a direction the same as that of member 10ª until it has first gone in a direction reverse to that of member 10ª, at least until the dead center position is reached. When the dead center position is reached, 11ª could continue to go in a direction reverse to that of the temporary driving member 10ª but, if a load is being carried by the temporary load member 18ª, considerable pressure will be exerted upon the center pinion 11ª to induce it to go along in the same direction with 10ª. Thus, the control member 11ª, after first going reverse to member 10ª as far as the dead center position, will be changed in its direction because of the reaction of the member 10ª against the member 18ª so that all the members, 11ª, 10ª and 18ª, will travel together at the same angular speeds and the device will be in high gear. If, at this time, sufficient power is applied to the original driving member 18ª, so as to make it pick up the load, the original load member 10ª will again become the driven member and the device will continue to operate in high gear until the control member 11ª reverses.

Thus, in Fig. 3, it will be seen that if 18ª is for awhile, the driving member, 11ª is the member ordinarily held against rotation and 10ᵇ (same as 10ª) is the driven member, the resultant torque acting upon member 11ª, will be in a direction around axis X—Y tending to revolve member 11ª oppositely to the direction in which members 10ᵇ and 18ª are moving.

However, should member 10ᵇ temporarily become the driving member instead of 18ª causing member 18ª to temporarily become the driven member, as is often the case when the driving power from an engine is lessened or cut off and momentum of parts, or gravity, or other source of movement, changes the driver into a driven member, the resultant torque acting upon the member 11ª (which in my improved form of transmission will be free to move) is a force tending to cause member 11ª to rotate about the axis X—Y in the same rotative direction as member 10ᵇ. This resultant force, as last illustrated, will be made use of in my two-speed power transmission, to automatically change mechanism from low into high gear by the simple expediency of causing the driven member 10ᵇ to momentarily become the driving member instead of 18ª.

In every case where one member is said to be held against rotation it is merely in reference to the conventional type of gearing in which some member is held against rotation, as compared to my type of gearing in which all the members are free to rotate, although two of the elements of my type of gearing are always mutually restrained by being connected to a so-called sliding member for which the frame is supposed to be the ultimate holding element.

Referring to Fig. 4 which is a broken section looking along axis X—Y so as to illustrate the actual leverages involved in the workings of this two-speed transmission, the various parts may be easily identified by the designating numerals and letters which are identical to those used in Fig. 1 or, the various parts designated by the numerals and letters are the mechanical equivalents of the parts more clearly shown in Fig. 1.

To prove that the members 18 and 10ª, being respectively the driving and driven members in my two-speed power transmission, may revolve at proportionally different velocities, I have used the simple idea of suspending weights from said two members so as to exactly duplicate the conditions of strain existing between them at a certain instant while under operating conditions and, the amounts of such weights as will be exactly balanced through means of the connections involved if such weights are suspended at points equally distant from their common axis of rotation X—Y (as per Fig. 4), will inversely represent the ratios of speed for the two members in question under actual operating conditions.

Thus, I have suspended from the end of a tooth carried by one of the epicyclic members 17, a weight E, of three hundred pounds which gives the same effect as if the weight were suspended from the shaft 18, for the instant at least. This weight E, is tending to rotate the member 18 and 18$^a$ in a clockwise direction around the axis X—Y. And, for the purposes of illustration, I have assumed that the annular gear 18$^a$ has three times as many teeth as the center pinion 11$^a$. With the connecting rods 14 and 15 spread apart as shown in the drawing of Fig. 4, the test of the angular velocity of the driving member 18 as compared to the angular velocity of the driven member 10$^a$ will be determined by the amount of weight which it is necessary to suspend from the shaft 10$^a$ so as to exactly balance the weight E, of three hundred pounds pulling in the opposite direction. And, by following the various leverages out as in the case of any simple leverage problem we find that a weight L, of five hundred pounds, is required to exactly balance the weight E, when both of the weights are suspended at points equally distant from axis X—Y.

The above simple test would indicate that the driving member 18, goes five turns for each three turns made by the driven member 10$^a$ and both the driving and driven members will revolve in the same direction and have proportionally different angular rates of speed i. e. under the conditions of Fig. 4.

Therefore, if a load be applied to the driven member 10$^a$ under the conditions of Figs. 4 and 18 is the driving member then, the third element or center pinion 11$^a$ will rotate reverse to the direction of the driving member 18. However, the load member 10$^a$ will be forced to go along in the same direction with the driving member 18, just as many turns as the third element 11$^a$ goes in the reverse direction to 18, because of the restraining members 14, 15, 10, 11 and 13.

To follow more clearly the several leverages involved in said two-speed power transmission, it will be noted that any pull on member 18 or 18$^a$ will be transmitted to member 11$^a$ through the epicyclic pinions 17. If the movement of 18$^a$ encounters any resistance in the pinion 11$^a$, which it is naturally trying to turn in a rotative direction around the axis X—Y, that is opposite to its own rotative movement around X—Y, pressure will be exerted upon the pinions 17 tending to force them along in the same direction with 18$^a$.

Ordinarily one of members 11$^a$, 18$^a$ or 10$^b$ (carrying pinions 17), is fixed or held against movement either by being secured to the frame of the device, or by some braking or friction device in which case only the movement of two bodies is concerned.

In my two-speed transmission here illustrated I have adopted the novel and different principle of allowing all three bodies such as 11$^a$, 18$^a$ and 10$^b$ (carrying pinion 17) to move. Each one to move in a direction about the axis X—Y in a path of least resistance, and two of the bodies to be mutually restrained by their common connections to the piston 13.

Therefore in this case I have tied center pinion 11$^a$ onto the eccentric 11, which gives the leverage result as shown in the drawings where an arm supported by 11$^a$ is extended out from X—Y equal to the pitch diameter of 11$^a$, to represent eccentric 11 whereby it moves the connecting rod 15 to act upon piston pin 19 of piston 13, which in turn connects to pinions 17 through the equal length connecting rod 14, and disk body 10$^b$.

Since pinions 17 are supported by member 10$^b$ for rotation about their respective axis, (said axis in this case being located 2″ away from main axis X—Y and parallel to it), member 10$^b$ is interconnected to member 11$^a$ so that for each turn of member 11$^a$ in any certain direction around its axis X—Y, there must be an equal angular turning of member 10$^b$ (being the same as 10$^a$ and 10) in the same rotative direction around axis X—Y or in the opposite direction around said axis X—Y.

Thus, when motion and power are imparted to member 18$^a$ by some external force such as a weight attached to shaft 18 and this motion is imparted to center pinion 11$^a$ through an endless system of levers (mechanically representing pinions 17) it will be noted that for every turn, which in this case 11$^a$ would make in a counterclockwise direction around the axis X—Y, the members 10, 10$^a$ and 10$^b$ must also make the same number of turns around axis X—Y in a clockwise direction or else member 11$^a$ must move clockwise around axis X—Y the same number of turns that 10$^b$ goes clockwise around said axis X—Y, but this latter case would be direct drive, which has already been explained so only the case where members 11$^a$ and 10$^b$ rotate about axis X—Y in opposite directions will be considered.

Considering the momentary leverages only and using the weights shown for reproducing the actual conditions of strain on the various members at a certain instant of operation and still assuming that 18$^a$ has three times as many teeth as 11$^a$ and also assuming the pitch diameter of 18$^a$ to be 6″, it will be seen that a weight E, on member 18$^a$ of three hundred pounds, representative of the same weight hung on one end of a lever 2″ long supported in its center by member 10$^b$ and having the gear leverage of member 11$^a$ fulcrumed on axis X—Y reacting against the other end, as clearly shown in Fig. 4, that said weight will cause six hundred pounds pull upon member 10$^b$ at a point 2″ from axis X—Y and said three hundred pounds acting through pinions 17 will give three hundred pounds resultant torque on pinion 11$^a$ at 1″ from axis X—Y.

Since the arm 11, which represents the leverage effect of the eccentric 11, has been made longer for the purpose of more clearly showing the leverages involved and joins connecting rod 15 at a point 2″ from axis X—Y, the resultant torque here will be one hundred fifty pounds pulling downwardly upon connecting rod 15 which, through the medium of piston 13, pin 19 and rod 14, this same resultant torque of one hundred fifty pounds at 2″ from axis X—Y is utilized to help push member 10$^b$ around axis X—Y in a clockwise direction. Thus, the original pull upon member 10$^b$ of six hundred pounds at 2″ is reinforced by one hundred fifty pounds more pull at 2″ from axis X—Y making a total of seven hundred fifty pounds acting upon member 10$^b$ at a point 2″ from the axis X—Y, tending to rotate said member around axis X—Y in a clockwise direction.

Since member 10$^a$ is the same as member 10$^b$, for the sake of clearness, the member 10$^a$ is shown supporting a weight L, of five hundred pounds at a point 3″ from axis X—Y tending to rotate it in a counterclockwise direction.

However member 10$^a$ being the same as member 10$^b$, is being acted upon by a pull of seven hundred fifty pounds at 2″ from axis X—Y for clockwise rotation, which force will exactly balance the weight of five hundred pounds pulling against member 10$^a$ as illustrated.

Thus, a reduction in speed of five for member 18 and three for member 10$^a$ is obtained with a corresponding increase in mechanical advantage of member 10$^a$ over 18.

It should be noted that in case pinion 11$^a$ is made the driving member instead of 18$^a$, and eccentric 11 is solidly fixed to member 18$^a$ instead of 11$^a$, it would cause a mechanical advantage between 10$^a$ and 11$^a$ in reverse directions.

The principal factor tending to keep this two-speed mechanism in high gear, will be the momentum of parts which must be overcome by the internal stress or strain acting between the driving and driven members while in direct drive, before such parts can reverse and throw the mechanism into low gear. It should be noted that the elements 11$^a$ and 10$^a$ are tied together by the connecting rods 15 and 14, eccentrics 11 and 10 and the piston 13 so that, in theory and to all practical intents, they have the same angular movement at all times. However, under certain conditions of strain and stress between the elements 11$^a$ and 10$^a$, which is also representative of the stress and strain between the elements 18$^a$ and 10$^a$, the element 11$^a$ will go ahead of the element 10$^a$ a very few degrees or it will lag behind the element 10$^a$ a very few degrees, because of the impossibility of having perfect fitting connection bearings and, this very slight angular lead or lag in the element 11$^a$ will be a factor in the operation of the device under certain conditions i. e. where the mechanism changes from high gear to low gear and vice versa, while the driving and driven elements are operating at fairly high rates of speed. And also, the weight and speed of the element 11$^a$, as expressed in its momentum, will be a factor in the operation of the device, since the momentum of this element will be relied upon to carry it over the dead center position each time so as to prevent the device from changing from one gear to another.

Thus, because of this very slight and usually unnoticed lag or lead in the control element 11$^a$, it will be possible for it to come to a dead stop and be reversed by the power of the driving element reacting against the load element while the last mentioned two elements continue to rotate at fairly high rates of speed. This factor as just explained is believed to be one of degree only and, as such, it has been described and mentioned herein. Therefore, in every case where it has been mentioned that the elements 11$^a$ and 10$^a$ have equal angular movements it is to be understood that one of the elements may lag behind the other a very slight amount.

The embodiment of the idea of my invention is intended for application in numerous other instances and under different arrangement and location of the operative members, in fact the further arranging of the principal members could be extended to any location for any particular member and still be operatively connected to a mechanism as already shown and described, merely by extending the various members to the different positions.

It is the spirit of my invention to make use of the so-called resultant torque inherent in all mechanical advantage and reversing mechanisms when they are operating as such, by allowing such resultant torque or force, to transfer itself ultimately to the frame by causing movement of parts (ordinarily held against movement) connecting to either the driving or driven member through the medium of a member sliding against the frame.

And it should be understood that resultant torque as I have chosen to call it, can find its way directly to the frame of such devices, before mentioned, by having one or more necessary elements solidly held by the frame as in the conventional type or, on the other hand, resultant torque may find its way ultimately to the frame through means allowing movement of such elements having interconnections to the frame and driver or driven member, as in the case of my two-speed transmission.

And, further, it is the spirit of my invention that no mechanical change or adjustment of parts is necessary in the operation of my two-speed power transmission.

Broadly speaking, the sum total of my invention is based on the idea that movement of one body will cause movement of another body and, by the same means, the same movement of the one body will cause a proportionally different movement of the other body.

In the foregoing description and in the following claims, it should be understood that the use of names, such as driving and driven are merely designations for a plurality of members, parts, and so forth, and have no physical bearing upon the same, and further, that source of power may originate in said combination of members, or parts, (as in a case where the piston member is propelled by some explosive force), so that the device may operate as a two speed internal combustion engine. Any member described as a driving member, may be physically the driven member, and so on, but in every case component forces acting upon one member, frame, or body, will be resultant in a force or forces acting upon some other member, frame or body.

It will be readily understood that minor changes in the size, form and construction of the various parts of my improved two-speed transmission may be made and substituted for those herein shown and described without departing from the spirit of my invention, the scope of which is set forth in the appended claims.

I claim as my invention:

1. In a power transmission, in combination, a planetary set comprised of gearing controlled by a plurality of co-axial members and a frame supporting all of said members for independent rotation, a reciprocation member also supported by said frame for reciprocation, means connecting said reciprocation member to one of said gear controlling members and means connecting said reciprocation member to another one of said gear controlling members.

2. In a two speed prime mover, the combination with a planetary set supported for co-axial rotation of all its elements, of means to drive two of the elements thereof from a common source of power, of disk wheels, having uneven weights, carried by said two commonly driven elements, to cause the one to lag behind the other and be reversed thereby, and of a driving connection from said common source of power operating in an annular recess formed off-center in each of said disk wheels to provide counterbalanced eccentrics.

3. In a power transmission, in combination, a planetary set supported for co-axial operation of all its elements, two shafts also supported for rotation about a common axis, means to restrain said two shafts to equal amounts of turning relative to a reference point, said means allowing the reversal, at pre-determined points in their arcs, of either one of said shafts independently of each other, and further means co-acting to join said shafts to different elements of said planetary set.

4. In a power transmission, in combination, an epicyclic train comprised of an annular wheel, a center wheel and co-acting epicyclic means journaled to a third member adapted to be driven by said annular wheel and said center wheel under certain combinations of movement by the latter mentioned members, a piston supported for reciprocation, a fly-wheel carried by one element of said epicyclic train, means joining said piston to said fly-wheel and means joining said piston to another element of said train.

5. In a power transmission, in combination, a differential mechanism comprising three members supported for rotation about a common axis and gearing carried by each of said members co-acting to form said mechanism, a counterbalanced fly-wheel-eccentric of a given weight carried by one of said members and a counterbalanced fly-wheel-eccentric of a different weight carried by another one of said members, a reciprocatory member and means operatively connecting said reciprocatory member to each of said fly-wheel-eccentrics.

6. A differential mechanism supported by a frame for co-axial turning of all its elements, a fly-wheel formed integral with one of the elements thereof, of a weight adapted to control the movement of said element and allow its reversal under pre-determined conditions, a fly-wheel formed integral with another one of the elements thereof, of a weight sufficient to preclude its reversal, under ordinary conditions, and furnish power to control the reversal of the first mentioned fly-wheel, and the combination therewith of means to impart equal amounts of movement to each of said fly-wheels.

7. In a power transmission, in combination, two members supported for angular displacement about a common axis, a third member adapted to have angular displacement relative to said two members and about said common axis, restraining means carried by said third member connecting to each of said two members to restrain the latter to equal amounts of turning with respect to said third member, a planetary set supported for rotation of all its elements, one of said elements connecting to one of said two members and a different one of said elements connecting to the other one of said two members.

8. The combination with a frame supporting a planetary set for co-axial rotation of all its elements and a piston for reciprocation, of a counterbalanced eccentric having an annular recess therein carried by one of the elements of said planetary set, of a similarly counterbalanced eccentric having a recess therein carried by another element of said planetary set, and of separate connecting rods joined to said piston and operating in said annular recess of said eccentrics, one in each recess, whereby power delivered to said piston will be transmitted to one of the elements of said planetary set in one degree of torque when said eccentric members are operating in identical directions, and to said element in a proportionally different degree of torque whenever said eccentric members are operating in opposite directions.

9. In a power transmission, in combination, a frame supporting three members for rotation about a common axis, an annular gear carried by one of said three members, a spur pinion carried by another one of said three members and epicyclic gearing operatively journaled to and carried by the third one of said three members co-acting with said annular gear and said spur pinion to form a planetary set, a piston supported for reciprocation by said frame, combination fly-wheel eccentrics of unequal moments carried by two of said three members and driving rods joining said piston to each of said flywheel eccentrics.

10. In a power transmission, in combination, a frame supporting a planetary set for rotation of all its elements and a reciprocation member for reciprocation, a connecting rod joining said reciprocation member to an off-center means carried by one of said elements to drive the same in forward and in reverse directions, a connecting rod joining said reciprocation member to an off-center means carried by another one of said elements to drive the same in forward and in reverse directions, and both of said connecting rods co-acting to allow the reversal of either one of said driven elements at the dead center points of their travel.

11. In a power transmission, in combination, a frame supporting three members for co-axial rotation, an annular gear formed upon one of said three members, a spur pinion carried by another one of said three members, and spur gearing intermeshing with said annular gear and said spur pinion journaled to and carried by the third one of said three members, a piston also supported by said frame for reciprocation, a connecting rod joining said piston to an off-center device carried by said spur pinion and a connecting rod joining said piston to an off-center device carried by the one of said three members controlling said spur gearing, whereby motion imparted to one of said three members will be resultant in motion of another one of said three members in one degree and in a proportionally different degree.

12. In a power transmission, in combination, a planetary set arranged for co-axial rotation of all its elements, a support member also operable about the same axis with said elements, a restraining means carried by said support member having connections to two of the elements of said planetary set to allow said two elements to rotate together and in opposite directions relative to said support member.

13. In a power transmission, in combination, a planetary set comprising the elements of an annular gear, center pinion and interconnecting epicyclic gearing, a frame supporting all of said elements for rotation, an intermediate member supported by said frame for movement relative thereto and separate connecting rods joining said intermediate member to a plurality of the elements of said planetary set.

14. In combination, an epicyclic train, a piston and separate rods joining said piston to different elements of said train.

15. In combination, a compensating mechanism, a counterbalanced eccentric formed upon one of its elements, a similar eccentric formed upon another one of its elements, a member supported for reciprocation and having individual drive connections to said eccentrics.

16. In combination, two shafts supported to rotate, non-adjustable means interconnecting said two shafts to drive them and allow of their independent reversal, a differential and further means co-joining said two shafts to separate elements of said differential.

17. In combination, an epicyclic train supported by a frame for co-axial turning of all its elements, an intermediate member also supported by said frame so as to move relative thereto, counterbalanced eccentrics carried by a plurality of the elements of said train and separate rods connecting said eccentrics to said intermediate member.

18. In combination, two members and a third member journaled in alignment, non-adjustable means interconnecting all of said members whereby said two members will be restrained to equal angular turning with respect to said third member and either one of said two members will be free to change its direction with respect to said third member and independently of the other one of said two members, a compensating mechanism and further means co-joining said two members to different elements of said mechanism.

19. In combination, a differential, a piston supported for reciprocation and separate connections therefrom to individual elements of said differential.

20. In combination, a planetary set, two members supported to rotate, non-adjustable reversing means interconnecting said two members and further means co-joining said two members to different elements of said set.

21. In combination, a piston prime mover, a compensating mechanism, non-adjustable means joining said piston prime mover to one element of said mechanism and non-adjustable means joining said piston prime mover to another element of said mechanism.

22. In combination, two shafts revoluble about a common axis, non-adjustable means interconnecting said two shafts, to drive them in identical directions and in opposite directions, an epicyclic train and further means co-joining said two shafts to different elements of said train.

23. In combination, two shafts revolubly supported, eccentrics formed integral upon each of said shafts, a member supported for reciprocation, connecting rods individually joining said eccentrics to said reciprocation member, a differential and means joining said two shafts to a plurality of the elements of said differential.

24. In combination, a planetary set, a driver, eccentrics formed upon a plurality of the elements of said set and separate connecting rods from said driver to said eccentrics.

25. In combination, a frame supporting a compensating mechanism for turning of all its elements and a control member for reciprocation, eccentrics formed upon a plurality of the elements of said mechanism and individual rods joining said control member to said eccentrics.

26. In combination, a compensating mechanism, a reciprocative driver and separate non-adjustable drive connections from said driver to different elements of said mechanism.

27. In combination, a differential, a member supported for reciprocation and separate rods therefrom to different elements of said differential.

28. In combination, an epicyclic train, a reciprocative driver, eccentrics formed upon two of the elements of said train and separate drive rods from said driver to said eccentrics.

29. In combination, an epicyclic train supported for free turning of all its elements, a piston prime-mover and separate connections therefrom to different elements of said train.

30. In combination, a differential supported for free turning of all its elements, a member supported for reciprocation and having non-adjustable drive connections therefrom to a plurality of the elements of said differential.

31. In combination, an epicyclic train supported by a frame for turning of all its elements, a driver also supported by said frame so as to have movement relative thereto and non-adjustable means separately joining said driver to different elements of said train to drive them and allow of their independent reversal.

In testimony whereof I affix my signature.

WILLIAM A. CALDWELL.